United States Patent [19]

Stahl

[11] Patent Number: 4,682,069
[45] Date of Patent: Jul. 21, 1987

[54] KEY JOINT APPARATUS FOR ASSEMBLY OF ELECTRICAL MOTORS

[75] Inventor: Torvald Stahl, Alvsjo, Sweden

[73] Assignee: Flygt Aktiebolag, Solna, Sweden

[21] Appl. No.: 861,011

[22] Filed: May 8, 1986

[30] Foreign Application Priority Data

May 14, 1985 [SE] Sweden .................................. 8502391

[51] Int. Cl.⁴ ............................. F16B 3/00; H02K 1/22
[52] U.S. Cl. ..................................... 310/261; 403/356; 403/359; 310/211
[58] Field of Search ............... 310/125, 166, 211, 216, 310/212; 403/356, 358, 359

[56] References Cited

U.S. PATENT DOCUMENTS

| | | | |
|---|---|---|---|
| 1,777,320 | 10/1930 | McCollum | 310/211 |
| 2,976,702 | 3/1961 | Pietsch | 403/356 |
| 3,420,556 | 1/1969 | Downie | 403/358 |
| 3,722,929 | 3/1973 | Gilman | 403/359 |

Primary Examiner—Patrick R. Salce
Assistant Examiner—D. L. Rebsch
Attorney, Agent, or Firm—John T. O'Halloran; Mary C. Werner

[57] ABSTRACT

The invention concerns a key joint for electric motors. More particularly, in order to obtain simplified assembly of a squirrel-cage rotor having inclined grooves to a shaft, a key joint is provided wherein the key comprises two integrated parts (1) and (2). The first part (1) has the same width and depth as the keyway in the shaft, while the second part (2) is inclined relative to the first part (1) and arranged radially outside of the latter.

1 Claim, 5 Drawing Figures

KEY JOINT APPARATUS FOR ASSEMBLY OF ELECTRICAL MOTORS

BACKGROUND OF THE INVENTION

The invention concerns a key joint for non rotational attachment of an electric rotor to a shaft.

A rotor for a squirrel-cage motor is provided with short-circuit bars around its it periphery. In order to obtain uniform operation of the motor, these bars are preferably somewhat inclined with respect to the shaft direction, meaning that none of the longitudinal grooves in the core discs of the rotor are parallel to the direction of the shaft. The inclination then depends on the number of grooves in the stator circuit, which in its turn depends on the number of poles, the effect of the field and the voltage.

The inclination of the grooves requires that the key joint employed to attach the large rotor to the shaft in a non-rotational manner, also must be inclined with regard to the direction of the shaft. This brings about certain problems. Thus, it may be difficult to obtain an appropriate depth for the keyway, especially at the ends thereof and in addition the great number of variants involved means that many shafts having varying inclinations of the keyway must be manufactured and maintained in stock.

An alternative to using a keyway in the motor shaft would be to attach a key to the shaft by using a fixture. Under these circumstances the key and the shaft are each provided with bores for accepting rivets to achieve final assembly. However, this solution has the disadvantage that a great number of different units or shaft and key combinations must be kept in stock.

In order to secure short delivery times, using known embodiments, ten different shaft units must typically be kept in stock. This of course is very expensive.

SUMMARY OF THE INVENTION

According to the invention a key joint is designed with a key for achieving simplified motor assembly. More particularly, in order to obtain simplified assembly of a squirrel-cage rotor having inclined grooves to a shaft, a key joint is provided wherein the key comprises two integrated parts (1) and (2). The first part (1) having the same width and depth as the keyway in the shaft, while the second part (2) is inclined relative the first part (1) and arranged radially outside of the latter.

BRIEF DESCRIPTION OF THE DRAWINGS

The invention is described more closely below with reference to the enclosed drawing in which.

DETAILED DESCRIPTION

Figure 1:
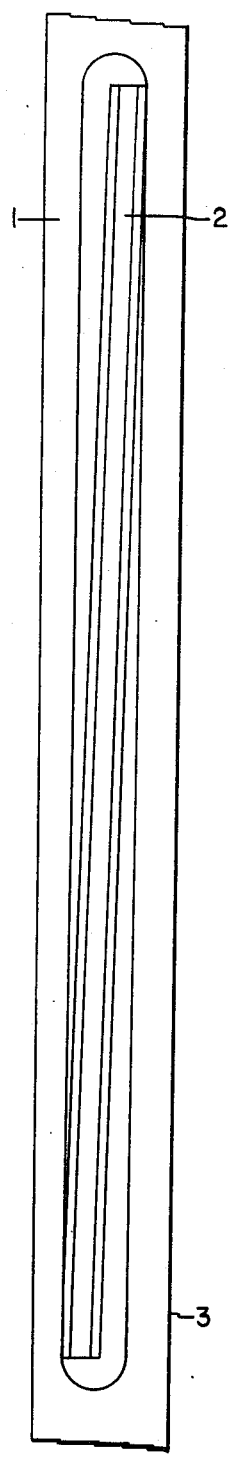
FIG. 1 is a top view of an exemplary embodiment of this invention showing a key according to this invention mounted in the keyway of a shaft.
Figure 2C:
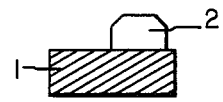
FIGS. 2A-2C are end views, partially in section, of first, second and third keys, respectively, configured in accordance with the teachings of the present invention.
Figure 2B:
Figure 2A:
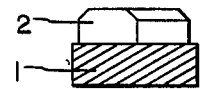
Figure 3:
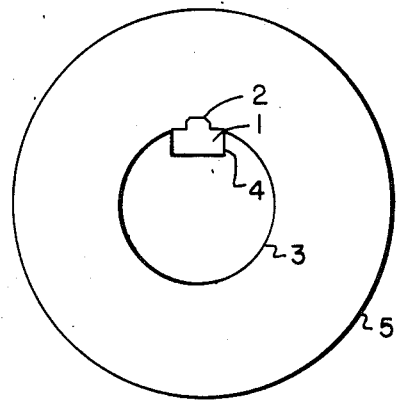
FIG. 3 is an end view schematically illustrating a rotor mounted upon a shaft employing the key joint according to the instant invention.

According to the invention the joint includes a conventional keyway extending in parallel with the direction of the shaft 3 and thus has the same design for all variants. The key that cooperates with the keyway 4 consists of two integrated parts 1 and 2. The first part has the same width as the keyway 4 and its height corresponds with the depth of said keyway. The second part 2 is narrower than the first part 1 and arranged diagonally with the latter. The second part 2 will thus cooperate with a keyway 4 in the core discs and secure the rotor 5 in a non rotational manner on the shaft 3. The inclination of the second part 2 with relation to the first part 1, as best shown in FIGS. 1 and 2A-2C, is so chosen that the intended inclination is obtained.

The great advantage in the joint according to the invention is that a shaft of a standard design always can be used and only a number of different keys must be kept in stock. This means less manufacturing costs as the price of a key is only some percent of the price of a shaft.

What is claimed is:

1. Improved key joint apparatus for assembling an electric rotor to a shaft, said shaft having a longitudinally extending keyway disposed in an axial direction thereon, the improvement comprising a key having first and second parts fixed in position with respect to one another, said first part for being disposed in said axial direction in said longitudinally extending keyway on said shaft, said first part having a width and height corresponding substantially to the width and depth, respectively, exhibited by said keyway, and said second part being narrower than said first part and extending in a radial direction therefrom, said first part and said shaft having a common axial direction and said second part extending diagonally over at least a portion of said first part along an axis which is inclined to said axial direction, said axial direction and said axis not intersecting when extended.

* * * * *